United States Patent
Appireddygari Venkataramana et al.

(10) Patent No.: US 11,055,016 B2
(45) Date of Patent: *Jul. 6, 2021

(54) METHOD AND SYSTEM FOR PRIORITIZING CRITICAL DATA OBJECT STORAGE DURING BACKUP OPERATIONS

(71) Applicant: EMC IP Holding Company LLC, Hopkinton, MA (US)

(72) Inventors: Mahesh Reddy Appireddygari Venkataramana, Bangalore (IN); Chetan Battal, Bangalore (IN); Swaroop Shankar D. H., Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/398,211

(22) Filed: Apr. 29, 2019

(65) Prior Publication Data

US 2020/0341643 A1 Oct. 29, 2020

(51) Int. Cl.
*G06F 12/00* (2006.01)
*G06F 3/06* (2006.01)

(52) U.S. Cl.
CPC .............. *G06F 3/065* (2013.01); *G06F 3/064* (2013.01); *G06F 3/0619* (2013.01); *G06F 3/0659* (2013.01); *G06F 3/0673* (2013.01)

(58) Field of Classification Search
CPC ........ G06F 3/065; G06F 3/0619; G06F 3/064; G06F 3/0659; G06F 3/0673; G06F 11/1469

(Continued)

(56) References Cited

U.S. PATENT DOCUMENTS

| 6,085,253 A * | 7/2000 | Blackwell ............... H04L 47/14 709/235 |
| 7,697,567 B2 * | 4/2010 | Ono ........................ H04L 47/50 370/468 |

(Continued)

OTHER PUBLICATIONS

Extended European Search Report issued in corresponding EP Application No. 20166271.5, dated Oct. 2, 2020 (7 pages).

(Continued)

*Primary Examiner* — Mardochee Chery
(74) *Attorney, Agent, or Firm* — Chamberlain, Hrdlicka, White, Williams & Aughtry

(57) ABSTRACT

A method and system for prioritizing critical data object recovery during restore operations. Specifically, the method and system disclosed herein entail reordering data objects, awaiting being read from backup storage and thus queued in one or more data object queues, in accordance with a nearest-critical based sequential order. The nearest-critical based sequential order may be derived through modified weight-based Euclidean distances calculated between adjacent data object pairs queued in any given data object queue. Further, the calculated modified weight-based Euclidean distances incorporate data criticality factors associated with the adjacent data object pairs. By reordering data objects in a nearest-critical based sequential order, critical data objects may be recovered first, thereby avoiding possible critical data loss should a disaster occur during restore operations.

20 Claims, 7 Drawing Sheets

(58) Field of Classification Search
 USPC .......................................................... 711/162
 See application file for complete search history.

(56) References Cited

U.S. PATENT DOCUMENTS

| | | | |
|---|---|---|---|
| 7,904,423 B2 * | 3/2011 | Vermeulen | G06F 16/184 |
| | | | 707/626 |
| 8,463,798 B1 | 6/2013 | Claudatos | |
| 9,846,622 B1 | 12/2017 | Roguine | |
| 2005/0177767 A1 | 8/2005 | Furuya | |
| 2016/0019119 A1 | 1/2016 | Gupta | |

OTHER PUBLICATIONS

Okfalisa et al., Comparative analysis of k-nearest neighbor and modified k-nearest neighbor algorithm for data classification, Comparative analysis of k-nearest neighbor and modified k-nearest neighbor algorithm for data classification, Nov. 1, 2017, pp. 294-298, 2017.

* cited by examiner

METHOD AND SYSTEM FOR PRIORITIZING CRITICAL DATA OBJECT STORAGE DURING BACKUP OPERATIONS

BACKGROUND

Existing data restoration solutions lack a mechanism to determine the recovery priority of data during restore operations. That is, should a disaster transpire during or before a restore operation completes, critical data may be lost while queued for recovery in a backup storage array.

DETAILED DESCRIPTION

Figure 1:
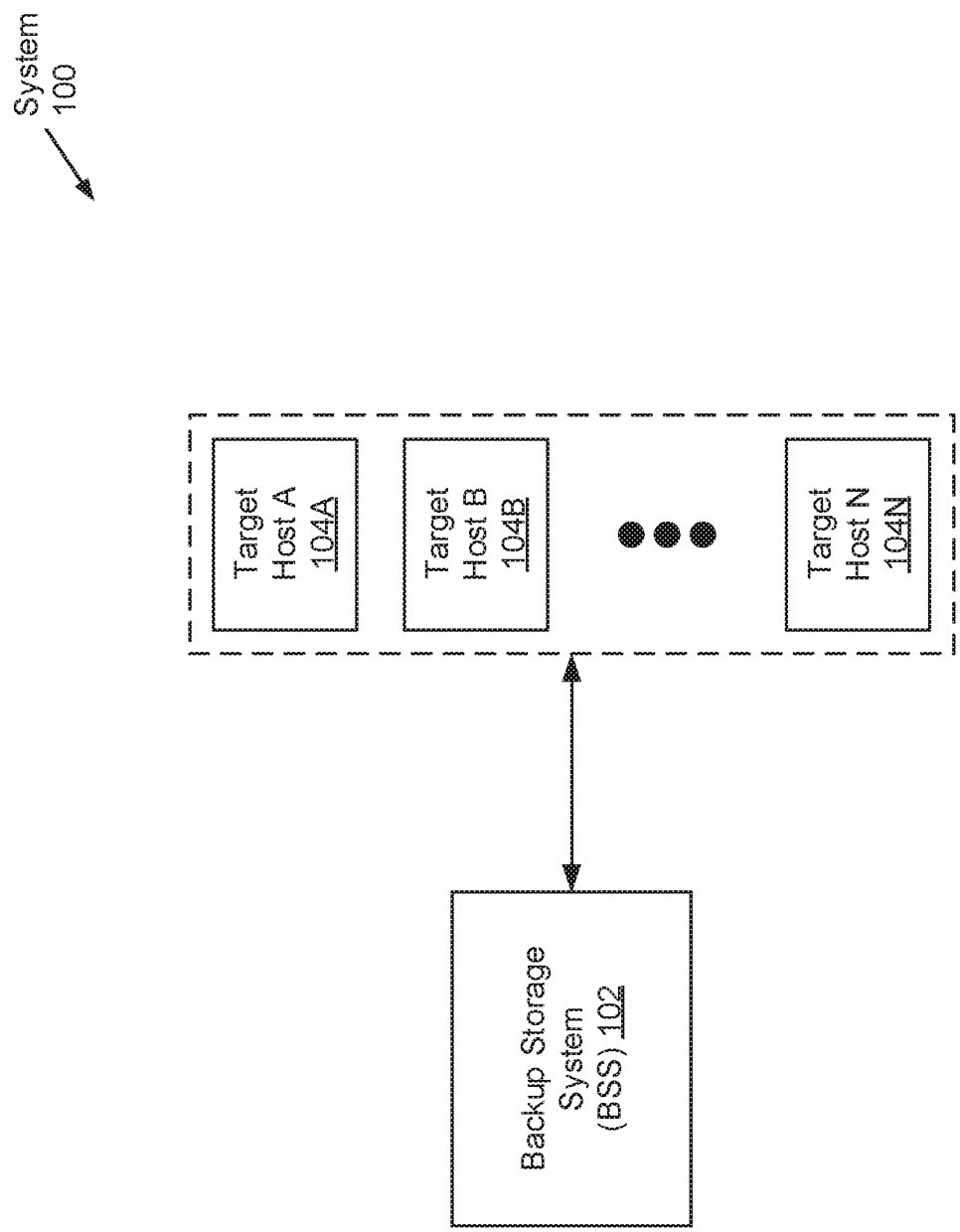
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for prioritizing critical data object recovery during restore operations. Specifically, one or more embodiments of the invention entails reordering data objects, awaiting being read from backup storage and thus queued in one or more data object queues, in accordance with a nearest-critical based sequential order. The nearest-critical based sequential order may be derived through modified weight-based Euclidean distances calculated between adjacent data object pairs queued in any given data object queue. Further, the calculated modified weight-based Euclidean distances incorporate data criticality factors associated with the adjacent data object pairs. By reordering data objects in a nearest-critical based sequential order, critical data objects may be recovered first, thereby avoiding possible critical data loss should a disaster occur during restore operations.

FIG. 1 shows a system in accordance with one or more embodiments of the invention. The system (100) may include a backup storage system (BSS) (102) operatively connected to one or more target hosts (104A-104N). Each of these components is described below.

In one embodiment of the invention, the BSS (102) may be directly or indirectly connected to the target host(s) (104A-104N) through a network (not shown) (e.g., a local area network (LAN), a wide area network (WAN) such as the Internet, a mobile network, etc.). The network may be implemented using any combination of wired and/or wireless connections. In embodiments in which the BSS (102) and the target host(s) (104A-104N) are indirectly connected, there may be other network components or systems (e.g., switches, routers, gateways, etc.) that may facilitate communications. Further, the BSS (102) and the target host(s) (104A-104N) may communicate with one another using any combination of wired and/or wireless communication protocols.

In one embodiment of the invention, the BSS (102) may represent a data backup, archiving, and/or disaster recovery storage system. The BSS (102) may be implemented using one or more servers (not shown). Each server may be a physical server (i.e., which may reside in a data center) or a virtual server (i.e., which may reside in a cloud computing environment). Further, in one embodiment of the invention, the BSS (102) may be implemented using one or more computing systems similar to the exemplary computing system shown in FIG. 6. The BSS (102) is described in further detail below with respect FIGS. 2A and 2B.

In one embodiment of the invention, each target host (104A-104N) may represent any physical computing system whereon one or more user programs (not shown) may be executing. These user programs may, for example, implement large-scale and complex data processing; and may service multiple users concurrently. Further, each target host (104A-104N) may provide and manage the allocation of various computing resources (e.g., computer processors, memory, persistent and non-persistent storage, network bandwidth, etc.) towards the execution of various processes (or tasks) that may be instantiated thereon. One of ordinary skill will appreciate that each target host (104A-104N) may perform other functionalities without departing from the scope of the invention. Examples of a target host (104A-104N) may include, but are not limited to, a desktop computer, a tablet computer, a server, a mainframe, a smartphone, or any other computing system similar to the exemplary computing system shown in FIG. 6. Target hosts (104A-104N) are described in further detail below with respect to FIG. 3.

While FIG. 1 shows a configuration of components, other system configurations may be used without departing from the scope of the invention.

Figure 2A:
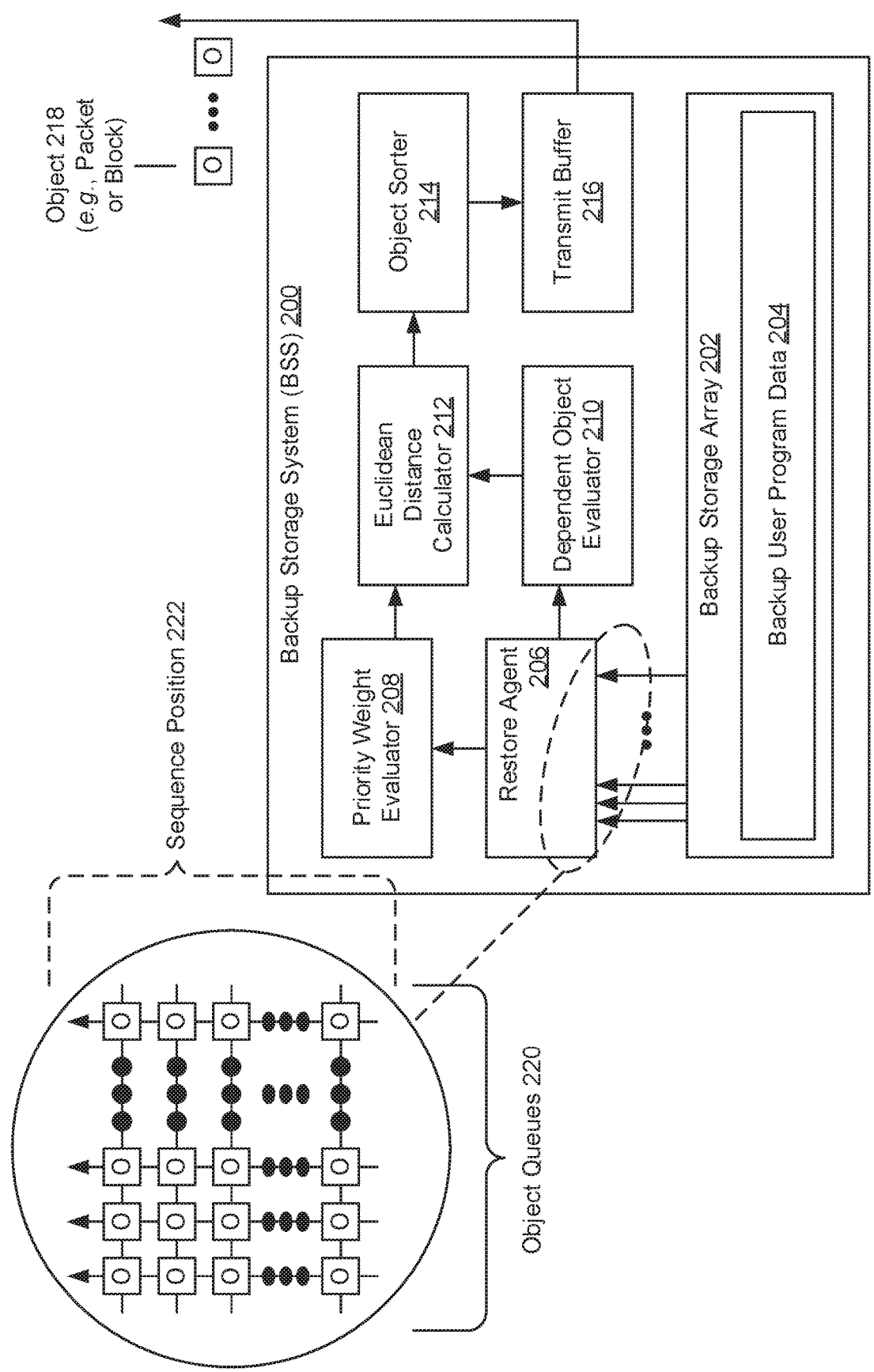
FIG. 2A shows a backup storage system in accordance with one or more embodiments of the invention.

FIG. 2A shows a backup storage system (BSS) in accordance with one or more embodiments of the invention. The BSS (200) described herein may operatively connect with a target host (not shown) described below with respect to FIG. 3. Further, the BSS (200) may represent a data backup, archiving, and/or disaster recovery storage system that includes a backup storage array (202), a restore agent (206), a priority weight evaluator (208), an Euclidean distance calculator (212), an object sorter (214), and a transmit buffer (216). Each of these components is described below.

In one embodiment of the invention, the backup storage array (202) may refer to a collection of one or more physical storage devices (not shown) on which various forms of information—e.g., backup user program data (204)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the backup storage array (202) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

Figure 3:
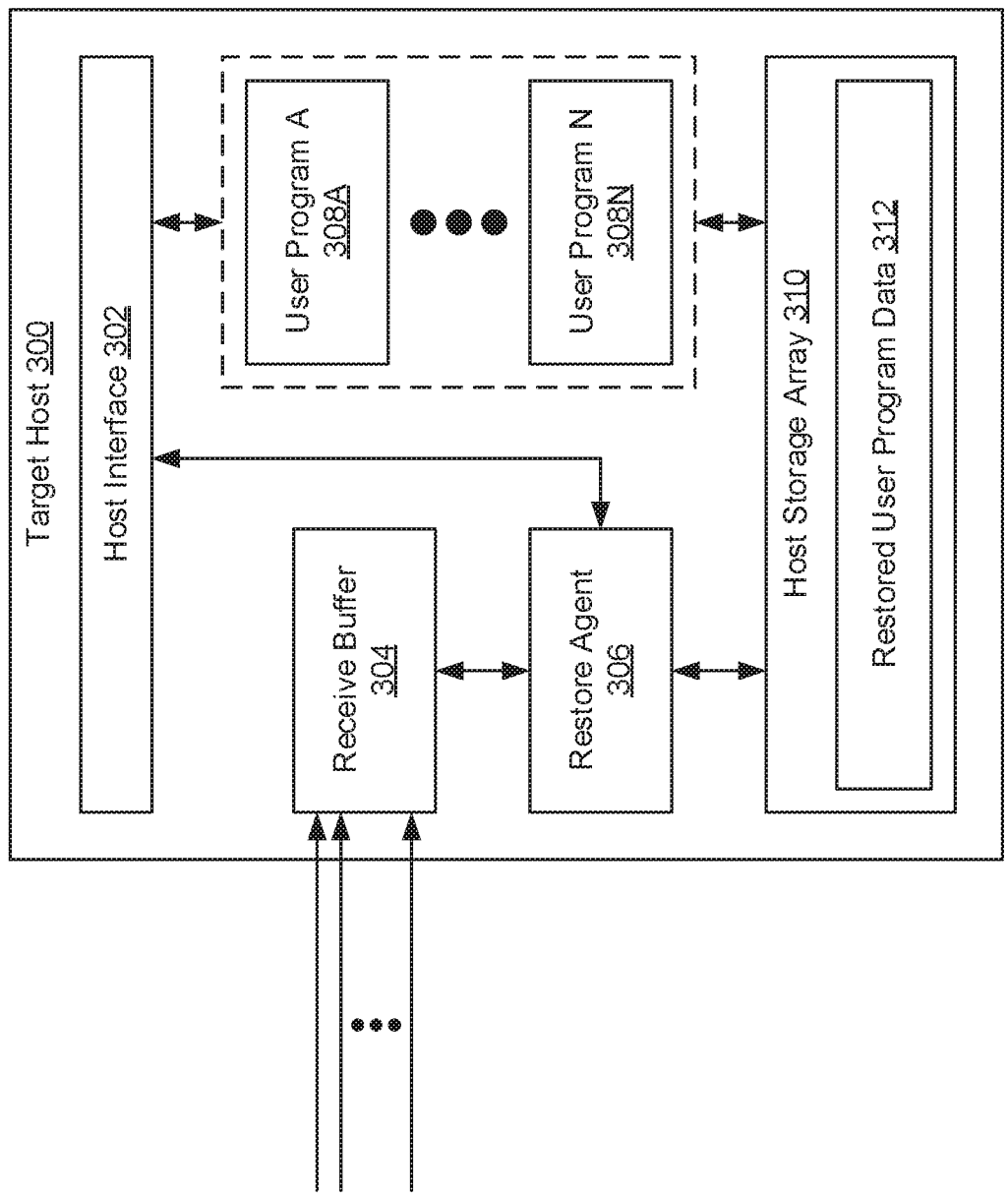
FIG. 3 shows a target host in accordance with one or more embodiments of the invention.

In one embodiment of the invention, backup user program data (204), which may be consolidated on the backup storage array (202), may refer to copies of any granularity of data associated with any given user program (not shown) may have been executing on a target host (see e.g., FIG. 3). Backup user program data (204) may entail, for example, application data, user data, configuration data, metadata, or any other form of data with which one or more user programs may interact.

In one embodiment of the invention, the restore agent (206) may refer to a computer program that may execute on the underlying hardware of the BSS (200). Specifically, the restore agent (206) may refer to a computer program designed and configured to implement data restore operations following a disaster at a target host. Accordingly, the restore agent (206) may include functionality to: identify and retrieve user program data (204), from the backup storage array (202), based on a configuration of the restore agent (206); encapsulate the retrieved user program data (204) across one or more data objects (e.g., one or more data packets or data blocks) (218); and queue the data object(s) (218) within a buffer (not shown). One of ordinary skill will appreciate that the restore agent (206) may perform other functionalities without departing from the scope of the invention.

In one embodiment of the invention, the priority weight evaluator (208) may refer to a computer program that may execute on the underlying hardware of the BSS (200). Specifically, the priority weight evaluator (208) may refer to a computer program designed and configured to identify a priority weight for any data object (e.g., data packet or data block) (218) queued by the restore agent (206). Accordingly, the priority weight evaluator (208) may include functionality to: examine header information appended to any given data object (218), to extract a data criticality factor embedded therein; identify a priority weight for the given data object (218) based on the extracted data criticality factor; and provide the identified priority weight for the given data object (218) to the Euclidean distance calculator (212). A data criticality factor may refer to a numerical or categorical classification that assigns a route operation prioritization to a given user program data (204) data type. By way of examples, a data type for user program data (204) may include, but are not limited to, a database record data type, a text data type, an image data type, a virtual machine configuration data type, etc. Furthermore, data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. Moreover, a priority weight for any given data object (218) may refer to a numerical value (e.g., integer, float, fraction, etc.) assigned to the given data object (218) that reflects the relative importance of the given data object (218) based on the data criticality factor with which the given data object (218) is associated. One of ordinary skill will appreciate that the priority weight evaluator (208) may perform other functionalities without departing from the scope of the invention.

In one embodiment of the invention, the dependent object evaluator (210) may refer to a computer program that may execute on the underlying hardware of the BSS (200). Specifically, the dependent object evaluator (210) may refer to a computer program designed and configured to generate stream dependency information (SDI) (if any). SDI may refer to information that relates two or more data objects (218) to one another. These related data objects (218) may pertain to a unique data object stream, which may be identified through examination of at least a portion of header information appended to the data objects (218). Accordingly, the dependent object evaluator (210) may include functionality to: examine header information (e.g., sequence number information) appended to data objects (218) queued by the restore agent (206), to determine whether one or more unique data objects streams are among the queued data objects (218); should at least one unique data object stream be identified, generate SDI that may identify the two or more data objects (218) belonging to each identified unique data object stream; and provide the generated SDI to the Euclidean distance calculator (212). One of ordinary skill will appreciate that the dependent object evaluator (210) may perform other functionalities without departing from the scope of the invention.

In one embodiment of the invention, the Euclidean distance calculator (212) may refer to a computer program that may execute on the underlying hardware of the BSS (200). Specifically, the Euclidean distance calculator (212) may refer to a computer program designed and configured to determine a modified weight-based Euclidean distance between any pair of adjacent data objects (218) queued by the restore agent (206). Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (described above), as expressed in the following mathematical formula:

$$E_{dw} = \sqrt{\Sigma_{i,j=1}^{n} |(p_i \cdot w_p - q_j \cdot w_p)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

Accordingly, in one embodiment of the invention, the Euclidean distance calculator (212) may include functionality to: receive priority weights associated with any data objects (212) queued by the restore agent (206) from the priority weight evaluator (208); receive stream dependency information (SDI) (if any) (described above) from the dependent object evaluator (210); map queued adjacent data object (218) pairs onto n-dimensional Euclidean space; compute modified weight-based Euclidean distances between queued adjacent data object (218) pairs that have been mapped onto the n-dimensional Euclidean space, factoring in the received priority weights and SDI (if any); and providing the computed modified weight-based Euclidean distances to the object sorter (214). When accounting for SDI in the computation of the modified weight-based Euclidean distances, the Euclidean distance calculator (212) may just consider the minimum modified weight-based Euclidean distance, of all the modified weight-based Euclidean distances, involving any of the identified dependent data objects (218) associated with the SDI. One of ordinary skill will appreciate that the Euclidean distance calculator (212) may perform other functionalities without departing from the scope of the invention.

In one embodiment of the invention, the object sorter (214) may refer to a computer program that may execute on the underlying hardware of the BSS (200). Specifically, the object sorter (214) may refer to a computer program designed and configured to sort data objects (218), queued by the restore agent (206), such that the nearest and most critical data objects (218) in each object queue (220) are placed at the front of the object queue (220). Accordingly, the object sorter (214) may include functionality to: receive modified weight-based Euclidean distances between queued adjacent data object (218) pairs from the Euclidean distance calculator (212); rearrange the queued data objects (218) in each object queue (220) based at least on the received modified weight-based Euclidean distances, to achieve a nearest critical based queuing scheme; and provide the rearranged, queued data objects (218) to the transmit buffer (216). A queuing scheme may refer to an order in which data objects (218) in a given object queue (220) may be arranged. The aforementioned nearest critical based queuing scheme subsequently arranges the data objects (218) in a given object queue (220) such that, in ranking order, the nearest and most critical data objects (218) occupy the front-most sequence positions (222), whereas the farthest and least critical data objects (218) alternatively occupy the rear-most sequence positions (222). One of ordinary skill will appreciate that the packet sorter (214) may perform other functionalities without departing from the scope of the invention.

In one embodiment of the invention, the transmit buffer (216) may refer to physical memory storage (e.g., random access memory (RAM)) wherein data objects (218) may be queued temporarily while awaiting transmission to the target host. Further, the transmit buffer (216) may include functionality to transmit one or more data object streams in a concurrent (or parallel) fashion. A data object stream may refer to a collection of data objects (218) belonging to a same or common restore job. In turn, a restore job may refer to a restore operation defined by a set of information such as, for example, the data (e.g., user program data (204)) being restored, the target location of the restoration (e.g., target host), and the time at which the restoration is being performed. Additional or alternative information may define a restore job without departing from the scope of the invention.

Figure 2B:
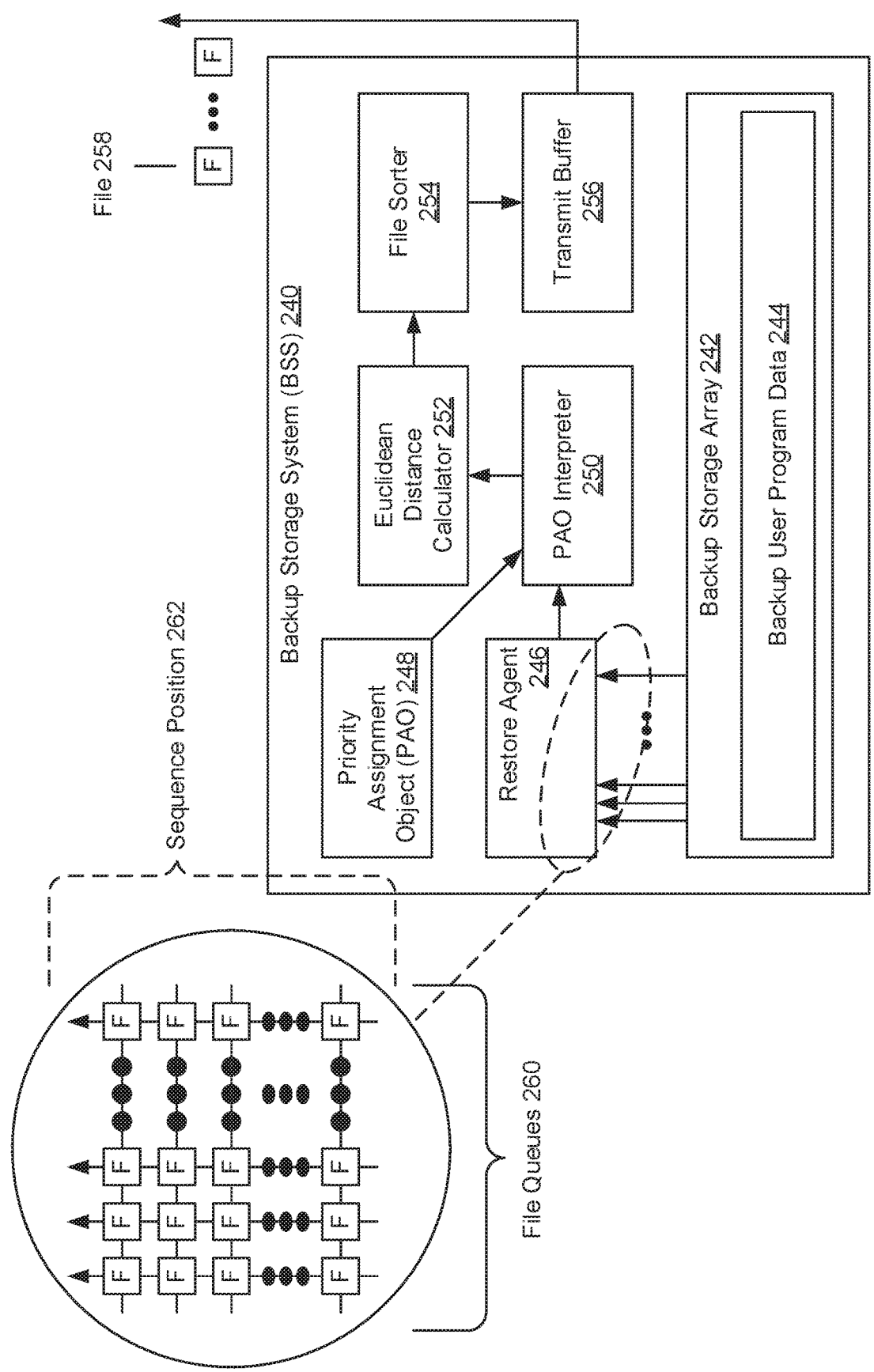
FIG. 2B shows a backup storage system in accordance with one or more embodiments of the invention.

FIG. 2B shows a backup storage system (BSS) in accordance with one or more embodiments of the invention. The BSS (240) described herein may operatively connect with a target host (not shown) described below with respect to FIG. 3. Further, the BSS (240) may represent a data backup, archiving, and/or disaster recovery storage system that includes a backup storage array (242), a restore agent (246), a priority assignment object (PAO) (248), a PAO interpreter (250), an Euclidean distance calculator (252), a file sorter (254), and a transmit buffer (256). Each of these components is described below.

In one embodiment of the invention, the backup storage array (242) may refer to a collection of one or more physical storage devices (not shown) on which various forms of information—e.g., backup user program data (244)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the backup storage array (242) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, backup user program data (244), which may be consolidated on the backup storage array (242), may refer to copies of any granularity of data associated with any given user program (not shown) may have been executing on a target host (see e.g., FIG. 3). Backup user program data (244) may entail, for example, application data, user data, configuration data, metadata, or any other form of data with which one or more user programs may interact.

In one embodiment of the invention, the restore agent (246) may refer to a computer program that may execute on the underlying hardware of the BSS (240). Specifically, the restore agent (246) may refer to a computer program designed and configured to implement data restore operations following a disaster at a target host. Accordingly, the restore agent (246) may include functionality to: identify and retrieve user program data (244), in the form of data files (258) from the backup storage array (242), based on a configuration of the restore agent (246); and queue the data files(s) (258) within a buffer (not shown). One of ordinary skill will appreciate that the restore agent (246) may perform other functionalities without departing from the scope of the invention.

In one embodiment of the invention, the PAO (248) may refer to a data structure or data object (e.g., file) that specifies user-defined mappings associating file types and/or filenames to data criticality factors. A file type may refer to metadata that describes a given data file (258) and, more specifically, may refer to metadata that indicates the file format in which user program data in the given data file (258) had been encoded for storage. Examples of file formats (or file types) may include, but are not limited to, a TXT file format for American Standard Code for Information Interchange (ASCII) or Unicode plain text data files; a MP4 file format for Moving Picture Experts Group (MPEG)-4 Part 14 multimedia data files; a PDF file format for Adobe Portable Document Formatted data files; a DOC for Microsoft Word formatted data files; and any other existing file format that may be used to encode data for storage. A filename, on the other hand, may refer to data file (258) metadata that indicates a unique name identifying and distinguishing the given data file (258) from other data files (258). Filenames may be expressed as arbitrary-length character strings encompassing any combination of characters (e.g., letters, numbers, certain symbols, etc.). Furthermore, a data criticality factor may refer to a numerical or categorical classification that assigns a route operation prioritization to a given data file (258) file type and/or filename. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In one embodiment of the invention, the PAO interpreter (250) may refer to a computer program that may execute on the underlying hardware of the BSS (240). Specifically, the PAO interpreter (250) may refer to a computer program designed and configured to interpret the PAO (248) and assign priority weights to data files (258) queued by the restore agent (246). Accordingly, the PAO interpreter (250) may include functionality to: examine metadata describing any given data file (258), to identify at the file type and filename associated with the given data file (258); perform a lookup on the PAO (248) using the identified file type and/or filename associated with the given data file (258); based on the lookup, obtain a data criticality factor assigned to the given data file (258) by users of the BSS (240); identify a priority weight associated with the data criticality factor, thereby assigning or associating the priority weight to/with the given data file (258); and provide the priority weight, for the given data file (258), to the Euclidean distance calculator (252). A data file (258) may refer to a unit of data (e.g., user program data (244)) representative of a contiguous container of data. One of ordinary skill will appreciate that the PAO interpreter (250) may perform other functionalities without departing from the scope of the invention.

In one embodiment of the invention, the PAO interpreter (250) may identify priority weights associated with given data criticality factors by way of prescribed user-defined mappings. Accordingly, these mappings may associate a given data criticality factor to a given priority weight. A data criticality factor may refer to a numerical or categorical classification that assigns a write operation prioritization to a given user program data (244) file type and/or filename Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. Moreover, a priority weight for any given data file (258) may refer to a numerical value (e.g., integer, float, fraction, etc.) assigned to the given data file (258) that reflects the relative importance of the given data file (258) based on the data criticality factor with which the given data file (258) is associated.

In one embodiment of the invention, the Euclidean distance calculator (252) may refer to a computer program that may execute on the underlying hardware of the BSS (240). Specifically, the Euclidean distance calculator (252) may refer to a computer program designed and configured to determine a modified weight-based Euclidean distance between any pair of adjacent data files (258) queued by the restore agent (246) and, thus, awaiting transmission. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (described above), as expressed in the following mathematical formula:

$$E_{dw} = \sqrt{\Sigma_{i,j=1}^{n} |(p_i \cdot w_p - q_j \cdot w_p)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

Accordingly, in one embodiment of the invention, the Euclidean distance calculator (252) may include functionality to: receive priority weights associated with any data files (258) queued by the restore agent (246) from the PAO interpreter (250); map queued adjacent data file (258) pairs onto n-dimensional Euclidean space; compute modified weight-based Euclidean distances between queued adjacent data file (258) pairs that have been mapped onto the n-dimensional Euclidean space, factoring in the received priority weights; and providing the computed modified weight-based Euclidean distances to the file sorter (254). One of ordinary skill will appreciate that the Euclidean distance calculator (252) may perform other functionalities without departing from the scope of the invention.

In one embodiment of the invention, the file sorter (254) may refer to a computer program that may execute on the underlying hardware of the BSS (240). Specifically, the file sorter (254) may refer to a computer program designed and configured to sort data files (258), queued by the restore agent (246), such that the nearest and most critical data files (258) in each file queue (260) are placed at the front of the file queue (260). Accordingly, the file sorter (254) may include functionality to: receive modified weight-based Euclidean distances between queued adjacent data file (258) pairs from the Euclidean distance calculator (252); rearrange the queued data files (258) in each file queue (260) based at least on the received modified weight-based Euclidean distances, to achieve a nearest critical based queuing scheme; and provide the rearranged, queued data files (258) to the transmit buffer (256). A queuing scheme may refer to an order in which data files (258) in a given file queue (260) may be arranged. The aforementioned nearest critical based queuing scheme subsequently arranges the data files (258) in a given file queue (260) such that, in ranking order, the nearest and most critical data files (258) occupy the frontmost sequence positions (262), whereas the farthest and least critical data files (268) alternatively occupy the rearmost sequence positions (262). One of ordinary skill will appreciate that the file sorter (254) may perform other functionalities without departing from the scope of the invention.

In one embodiment of the invention, the transmit buffer (256) may refer to physical memory storage (e.g., random access memory (RAM)) wherein data files (258) may be queued temporarily while awaiting transmission to the target host. Further, the transmit buffer (256) may include functionality to transmit one or more data file streams in a concurrent (or parallel) fashion. A data file stream may refer to a collection of data files (258) belonging to a same or common restore job. In turn, a restore job may refer to a restore operation defined by a set of information such as, for example, the data (e.g., user program data (244)) being restored, the target location of the restoration (e.g., target host), and the time at which the restoration is being performed. Additional or alternative information may define a restore job without departing from the scope of the invention.

FIG. 3 shows a target host in accordance with one or more embodiments of the invention. The target host (300) may represent a physical computing system that includes a host interface (302), a receive buffer (304), a restore agent (306), one or more user programs (308A-308N), and a host storage array (310). Each of these components is described below.

In one embodiment of the invention, the host interface (302) may refer to computer hardware and/or software through which a user may interact with various components (e.g., user program(s) (308A-308N), restore agent (306), etc.) of the target host (300). Accordingly, the host interface (302) may include functionality to: relay commands, instructions, and/or other input information from the user to one or more target host (300) components; and, conversely, present results and/or other output information from one or more target host (300) components to the user. One of ordinary skill will appreciate that the host interface (302) may perform other functionalities without departing from the scope of the invention. By way of examples, the host interface (302) may be implemented in the form of a command line interface (CLI), a graphical user interface (GUI), or any other interface design through which users may interact with the target host (300).

In one embodiment of the invention, the receive buffer (304) may refer to physical memory storage (e.g., random access memory (RAM)) wherein data objects (not shown) (e.g., data packets, data blocks, or data files) may be queued temporarily while awaiting restoration by way of write operations to the host storage array (310). Further, the receive buffer (304) may include functionality to provide any queued (or buffered) data objects to the restore agent (306). In addition, the receive buffer (304) may include further functionality to receive one or more data object streams in a concurrent (or parallel) fashion. A data object stream may refer to a collection of data objects belonging to a same or common restore job. In turn, a restore job may refer to a restore operation defined by a set of information such as, for example, the data (e.g., user program data (312)) being restored, the target location of the restoration (e.g., target host (300)), and the time at which the restoration is being performed. Additional or alternative information may define a backup job without departing from the scope of the invention.

In one embodiment of the invention, the restore agent (308) may refer to a computer program that may execute on the underlying hardware of the target host (300). Specifically, the restore agent (308) may refer to a computer program designed and configured to implement data restore operations following a disaster. Accordingly, the restore agent (308) may include functionality to: receive commands, instructions, and/or other input information from the host interface (302); obtain queued data objects from the receive buffer (306); and write the obtained data objects into the host storage array (310), thereby restoring any user program data (312) encapsulated by the obtained data objects. One of ordinary skill will appreciate that the backup agent (208) may perform other functionalities without departing from the scope of the invention.

In one embodiment of the invention, a user program (308A-308N) may refer to a computer program that may execute on the underlying hardware of the target host (300). Specifically, a user program (308A-308N) may refer to a computer program designed and configured to perform one or more functions, tasks, and/or activities directed to aiding a user of the target host (300). Accordingly, a user program (308A-308N) may include functionality to: receive commands, instructions, and/or other input information from the host interface (302); perform one or more functions, tasks, and/or activities for which the user program (308A-308N) is designed and configured in response to receiving the aforementioned commands, instructions, and/or other input information; read and/or write (i.e., store) respective user program data (312) from/to the host storage array (310) before, while, and/or after performing the functions, tasks, and/or activities; obtain results and/or other output information from performing the functions, tasks, and/or activities; and provide the aforementioned results and/or other output information to the host interface (302). One of ordinary skill will appreciate that a user program (308A-308N) may perform other functionalities without departing from the scope of the invention. Examples of a user program (308A-308N) may include, but are not limited to, a word processor, an email client, a database client, a virtual machine, a web browser, a media player, a file viewer, an image editor, a simulator, etc.

In one embodiment of the invention, the host storage array (310) may refer to a collection of one or more physical storage devices (not shown) on which various forms of information—e.g., user program data (312)—may be consolidated. Each physical storage device may encompass non-transitory computer readable storage media on which information may be stored in whole or in part, and temporarily or permanently. By way of examples, each physical storage device may be representative of a hard disk drive (HDD), a solid state drive (SSD), a magnetic tape storage system, or network attached storage (NAS). Further, in one embodiment of the invention, the host storage array (212) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, user program data (312), which may be consolidated on the host storage array (310), may refer to any granularity of data associated with any given user program (308A-308N). User program data (312) may entail, for example, application data, user data, configuration data, metadata, or any other form of data with which one or more user programs (308A-308N) may interact.

Figure 4:
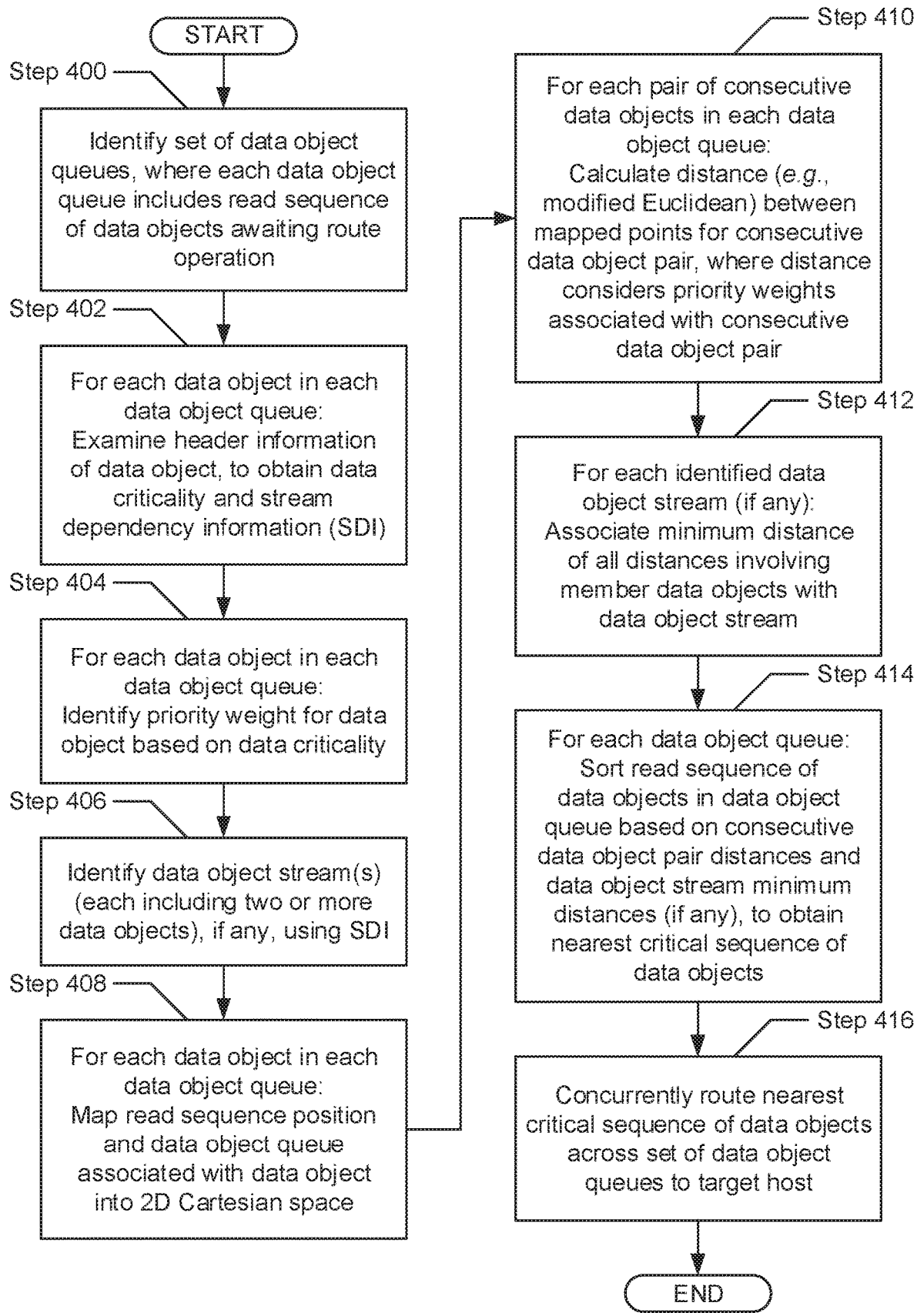
FIG. 4 shows a flowchart describing a method for prioritizing critical data packet or data block recovery during restore operations in accordance with one or more embodiments of the invention.

FIG. 4 shows a flowchart describing a method for prioritizing critical data packet or data block recovery during restore operations in accordance with one or more embodiments of the invention. The various steps outlined below may be performed by the backup storage system (BSS) portrayed in FIG. 2A. Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a set of data object queues is identified. In one embodiment of the invention, each identified data object queue may represent a first-in, first-out (FIFO) buffer. Further, each identified data object queue may include a sequence of data objects (e.g., data packets or data blocks), which may be awaiting transmission to a target host (see e.g., FIG. 3). The cardinality of (i.e., number of data objects in) the sequence of data objects in each identified data object queue may be the same or different throughout. Moreover, each sequence of data objects may be buffered in a respective data object queue in accordance with an arrival based queuing scheme. A queuing scheme may refer to an order in which data objects in a given data object queue may be arranged. The aforementioned arrival based queuing scheme subsequently arranges the data objects in a given data object queue in the order in which the data objects had been selected for restoration by a restore agent executing on the BSS.

In Step 402, for each data object queued in each data object queue (identified in Step 400), at least a data criticality factor for the data object is obtained. That is, in one embodiment of the invention, the header information of each data object may be examined to at least extract the data criticality factor for the data object. A data criticality factor may refer to a numerical or categorical classification that assigns a route operation prioritization to the data type associated with the user program data within a given data object. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme. In another embodiment of the invention, stream dependency information (SDI) may also be derived from the examination of header information pertaining to each data object. Specifically, information such as, for example, the data object sequence number may be extracted and used to derive SDI. Other non-limiting examples of header information that may be used include parent object information, parent stream information, I/O port properties, and base address pointers. In general, header information may correspond to any information that is common between the objects.

In Step 404, for each data object queued in each data object queue (identified in Step 400), a priority weight for the data object is identified. In one embodiment of the invention, a priority weight for any given data object may refer to a numerical value (e.g., integer, float, fraction, etc.) that may be assigned to the given data object, which may reflect the relative importance of the given data object based on the data criticality factor (obtained in Step 402) with which the given data object is associated. Furthermore, identification of the priority weight may entail accessing and interpreting user-defined mappings, which may associate data criticality factors to priority weights.

In Step 406, zero or more unique data object streams is/are identified using the SDI (obtained in Step 402). In one embodiment of the invention, SDI may refer to information that relates two or more data objects to one another. These related data objects may pertain to a unique data object stream. A data object stream (e.g., a data packet stream or a data block stream) may refer to a collection of data objects belonging to a same or common restore job. In turn, a restore job may refer to a restore operation defined by a set of information such as, for example, the data (e.g., user program data) being restored, the target location of the restoration (e.g., target host), and the time at which the restoration is being performed. Additional or alternative information may define a backup job without departing from the scope of the invention.

In Step 408, for each data object queued in each data object queue (identified in Step 400), the data object is mapped into a predefined Euclidean space (e.g., a two-dimensional Cartesian coordinate space). More specifically, in one embodiment of the invention, numerical values (e.g., natural numbers) representing a received sequence position and a given data object queue associated with a given data object may be mapped into the abscissa (i.e., x-coordinate) and ordinate (i.e., y-coordinate), respectively, of a data point representing the given data object in the Euclidean space. The received sequence position of the given data object may refer to the position, along the sequence of data objects (including the given data object) awaiting within a given data object queue, which the given data object occupies with respect to the front of the given data object queue. The given data object queue may refer to one of the above-mentioned, identified data object queues within which the given data object may await. The given data object queue may be assigned a numerical value based on the relative position of the given data object queue to other identified data object queues.

In Step 410, for each pair of consecutive (or adjacent) data objects in each data object queue (identified in Step 400), a distance between data points (mapped in Step 408), representative of the pair of adjacent data objects, is calculated. In one embodiment of the invention, the aforementioned distance may encompass a modified weight-based Euclidean distance. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (identified in Step 504), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P=\{p_1, p_2, p_3, \ldots, p_n\}$ and $Q=\{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

In Step 412, for each data object stream (if any had been identified in Step 406), the two or more member data objects, defining or belonging to the data object stream, are identified. Thereafter, in one embodiment of the invention, all distances (calculated in Step 410) between adjacent data object pairs, where at least one of the pair of data objects is a member data object of the data object stream, may be aggregated. Further, from this aggregation of distances, a minimum distance (i.e., a smallest distance amongst the aggregation of distances) may be identified and, subsequently, associated with the data object stream. The remaining distances identified into the aggregation of distances (i.e., distance(s) not identified as the minimum distance) may be discarded from consideration in the following steps described hereinafter.

In Step 414, for each data object queue (identified in Step 400), the received sequence of data objects (arranged in the arrival based queueing scheme (described above)), buffered within the data object queue, is sorted. In one embodiment of the invention, the received sequence of data objects may be sorted (or rearranged) based on or using the distances between data object pairs (calculated in Step 410) and the minimum distances (if any) (identified in Step 412) for one or more unique data objects streams (identified in Step 406). Further, based on the sorting, the received sequence of data objects may be rearranged into a nearest critical sequence of data objects, which may follow a nearest critical based queueing scheme. The aforementioned nearest critical based queuing scheme may arrange the data objects in a given data object queue such that, in ranking order, the nearest and most critical data object occupies the front-most sequence position of the given data object queue, whereas the farthest and least critical data object alternatively occupies the rear-most sequence position of the given data object queue. The front-most sequence position of the given data object queue may refer to the sequence position that may be transmitted (or routed) first to the target host. Accordingly, the nearest and most critical data objects(s) in the given data object queue gain route operation priority.

In Step 416, concurrently, the nearest critical sequence of data objects (obtained in Step 414) across all data object queues (identified in Step 400) are transmitted to the target host. That is, in one embodiment of the invention, executed as a parallel operation, the resulting nearest critical sequence of data objects (in the above-described order), for each data object queue, may be simultaneously transmitted or routed to the target host.

Figure 5:
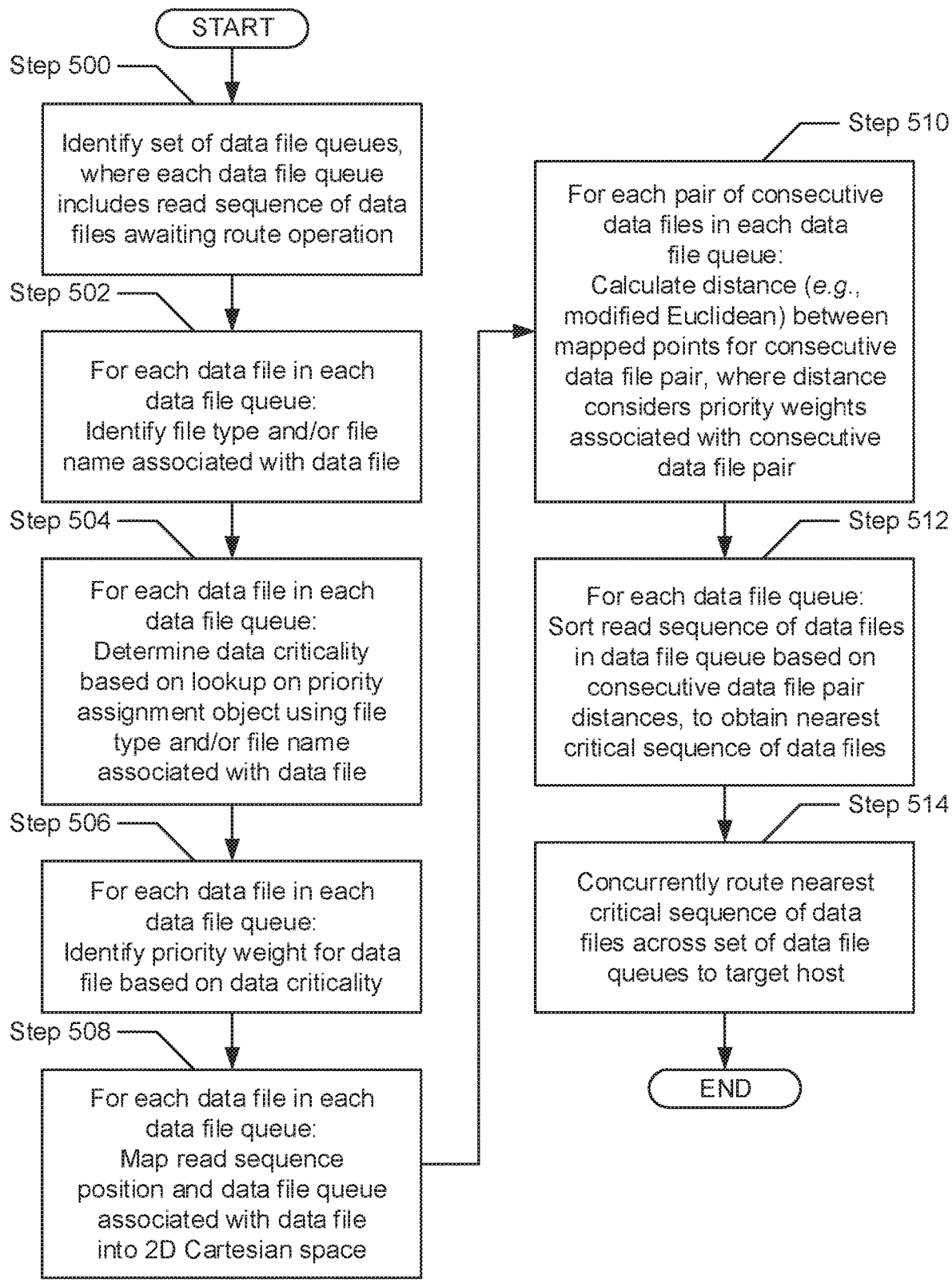
FIG. 5 shows a flowchart describing a method for prioritizing critical data file recovery during restore operations in accordance with one or more embodiments of the invention.

FIG. 5 shows a flowchart describing a method for prioritizing critical data file recovery during restore operations in accordance with one or more embodiments of the invention. The various steps outlined below may be performed by the backup storage system (BSS) portrayed in FIG. 2B. Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a set of data file queues is identified. In one embodiment of the invention, each identified data file queue may represent a first-in, first-out (FIFO) buffer. Further, each identified data file queue may include a sequence of data files, which may be awaiting transmission (or routing) to a target host (see e.g., FIG. 3). The cardinality of (i.e., number of data files in) the sequence of data files in each identified data file queue may be the same or different throughout. Moreover, each sequence of data files may be buffered in a respective data file queue in accordance with an arrival based queuing scheme. A queuing scheme may refer to an order in which data files in a given data file queue may be arranged. The aforementioned arrival based queuing scheme subsequently arranges the data files in a given data file queue in the order in which the data files had been selected for restoration by a restore agent executing on the BSS.

In Step 502, for each data file queued in each data file queue (identified in Step 500), a file type and/or filename associated with the data file is/are identified. In one embodiment of the invention, a file type may refer to metadata that describes a given data file and, more specifically, may refer to metadata that indicates the file format in which user program data in the given data file had been encoded for storage. Examples of file formats (or file types) may include, but are not limited to, a TXT file format for American Standard Code for Information Interchange (ASCII) or Unicode plain text data files; a MP4 file format for Moving Picture Experts Group (MPEG)-4 Part 14 multimedia data files; a PDF file format for Adobe Portable Document Formatted data files; a DOC for Microsoft Word formatted data files; and any other existing file format that may be used to encode data for storage. A filename, on the other hand, may refer to data file metadata that indicates a unique name identifying and distinguishing the given data file from other data files. Filenames may be expressed as arbitrary-length character strings encompassing any combination of characters (e.g., letters, numbers, certain symbols, etc.).

In Step 504, for each data file queued in each data file queue (identified in Step 500), a data criticality factor for the data file is determined. That is, in one embodiment of the invention, the file type and/or filename (identified in Step 502) may be used to determine the data criticality factor for the data file. More specifically, a lookup may be performed on a the priority assignment object using the identified file type and/or filename, to obtain the data criticality factor. The aforementioned priority assignment object may refer to a data structure or data object (e.g., file) that specifies user-defined mappings associating file types and/or filenames to data criticality factors. Furthermore, a data criticality factor may refer to a numerical or categorical classification that assigns a route operation prioritization to a given data file. Data criticality factors may be defined from any system- or user-defined prioritization scale. Examples of a data criticality factor may include, but are not limited to, any natural number (e.g., 1, 2, 3, . . . ), any categorical label (e.g., "low", "medium", "high", . . . ), and any other scalable classification scheme.

In Step 506, for each data file queued in each data file queue (identified in Step 500), a priority weight for the data file is identified. In one embodiment of the invention, a priority weight for any given data file may refer to a numerical value (e.g., integer, float, fraction, etc.) that may be assigned to the given data file, which may reflect the relative importance of the given data file based on the data criticality factor (determined in Step 504) with which the given data file is associated. Furthermore, identification of the priority weight may entail accessing and interpreting user-defined mappings, which may associate data criticality factors to priority weights.

In Step 508, for each data file queued in each data file queue (identified in Step 500), the data file is mapped into a predefined Euclidean space (e.g., a two-dimensional Cartesian coordinate space). More specifically, in one embodiment of the invention, numerical values (e.g., natural numbers) representing a received sequence position and a given data file queue associated with a given data file may be mapped into the abscissa (i.e., x-coordinate) and ordinate (i.e., y-coordinate), respectively, of a data point representing the given data file in the Euclidean space. The received sequence position of the given data file may refer to the position, along the sequence of data files (including the given data file) awaiting within a given data file queue, which the given data file occupies with respect to the front of the given data file queue. The given data file queue may refer to one of the above-mentioned, identified data file queues within which the given data file may await. The given data file queue may be assigned a numerical value based on the relative position of the given data file queue to other identified data file queues.

In Step 510, for each pair of consecutive (or adjacent) data files in each data file queue (identified in Step 500), a distance between data points (mapped in Step 708), representative of the pair of adjacent data files, is calculated. In one embodiment of the invention, the aforementioned distance may encompass a modified weight-based Euclidean distance. Generally, a Euclidean distance refers to a straight-line distance between two data points in a Euclidean space (e.g., an n-dimensional Cartesian coordinate space). The aforementioned modified weight-based Euclidean distance may therefore refer to the straight-line distance between a given data point pair, where the relative significance of each data point, of the given data point pair, is emphasized and accounted through the integration of their respective priority weights (identified in Step 604), as expressed in the following mathematical formula:

$$E_{dw} = \sqrt{\Sigma_{i,j=1}^{n} |(p_i \cdot w_p - q_j \cdot w_q)|^2},$$

where $E_{dw}$ is the modified weight-based Euclidean distance between two data points $P = \{p_1, p_2, p_3, \ldots p_n\}$ and $Q = \{q_1, q_2, q_3, \ldots, q_n\}$; where $w_p$ is the priority weight associated with data point P; where $w_q$ is the priority weight associated with data point Q; and where n is number of dimensions in the Euclidean space wherein the data points reside.

In Step 512, for each data file queue (identified in Step 500), the received sequence of data files (arranged in the arrival based queueing scheme (described above)), buffered within the data file queue, is sorted. In one embodiment of the invention, the received sequence of data files may be sorted (or rearranged) based on or using the distances between data file pairs (calculated in Step 510). Further, based on the sorting, the received sequence of data files may be rearranged into a nearest critical sequence of data files, which may follow a nearest critical based queueing scheme. The aforementioned nearest critical based queuing scheme may arrange the data files in a given data file queue such that, in ranking order, the nearest and most critical data file occupies the front-most sequence position of the given data file queue, whereas the farthest and least critical data file alternatively occupies the rear-most sequence position of the given data file queue. The front-most sequence position of the given data file queue may refer to the sequence position that may be transmitted (or routed) first to the target host. Accordingly, the nearest and most critical data files(s) in the given data file queue gain route operation priority.

In Step 514, concurrently, the nearest critical sequence of data files (obtained in Step 512) across all data file queues (identified in Step 500) are transmitted to the target host. That is, in one embodiment of the invention, executed as a parallel operation, the resulting nearest critical sequence of data files (in the above-described order), for each data file queue, may be simultaneously transmitted or routed to the target host.

Figure 6:
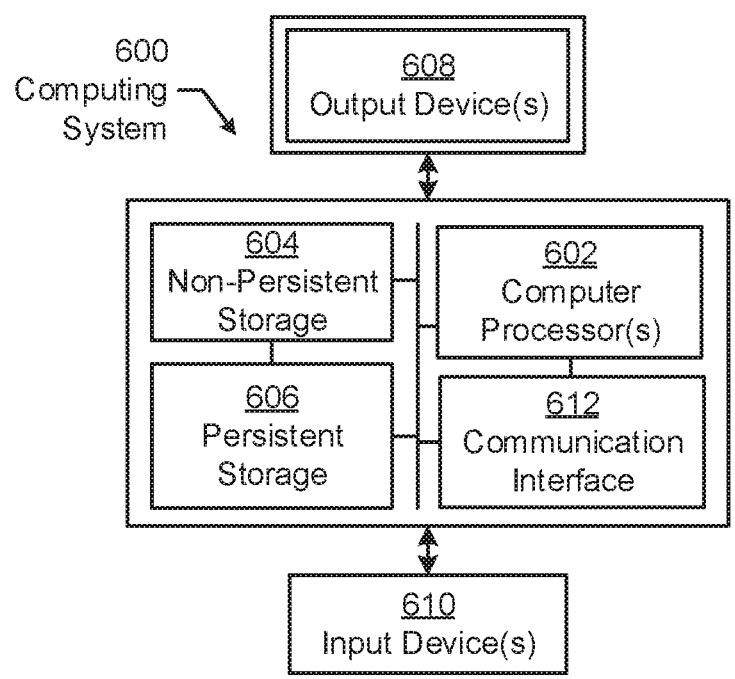
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for prioritizing queued data objects, comprising:
   identifying a data object queue comprising a set of data objects queued in a first sequential order;
   for each data object in the data object queue:
      mapping the data object to a data point in a coordinate space;
   for the data object queue:
      identifying a set of data object pairs, each comprising a pair of adjacent data objects queued in the data object queue;
      for each data object pair of the set of data object pairs:
         calculating a distance between a data point pair in the coordinate space that maps to the data object pair;

sorting the set of data objects queued in the data object queue based at least on the distance calculated for each data object pair;

obtaining, based on the sorting, the set of data objects queued in a second sequential order; and transmitting the set of data objects queued in the second sequential order to a target host.

2. The method of claim 1, further comprising:

for each data object in the data object queue:

obtaining a data criticality associated with the data object; and identifying a priority weight for the data object based on the data criticality, wherein the distance calculated for each data object pair incorporates the priority weight for each adjacent data object of the data object pair.

3. The method of claim 2, wherein the distance calculated for each data object pair is a modified weight-based Euclidean distance.

4. The method of claim 2, further comprising:

examining header information of each data object, to obtain the data criticality associated with the data object, wherein the data object is one selected from a group consisting of a data packet and a data block.

5. The method of claim 2, further comprising:

performing a lookup on a priority assignment object using at least one selected from a group consisting of a file type and a file name, associated with the data object, to obtain the data criticality associated with the data object, wherein the data object is a data file.

6. The method of claim 1, wherein the coordinate space is a two-dimensional Cartesian coordinate space.

7. The method of claim 6, wherein mapping the data object to the data point in the two-dimensional Cartesian coordinate space, comprises:

mapping a queue number associated with the data object to an abscissa of the data point; and mapping a sequence position associated with the data object to an ordinate of the data point, wherein the queue number identifies the data object queue within which the data object resides, wherein the sequence position identifies a location with respect to the first sequential order at which the data object resides.

8. The method of claim 1, wherein the first sequential order queues the set of data objects according to an arrival based scheme.

9. The method of claim 1, wherein each data object in the data object queue is one selected from a group consisting of a data packet, a data block, and a data file.

10. A non-transitory computer readable medium (CRM) comprising computer readable program code, which when executed by a computer processor, enables the computer processor to:

identify a data object queue comprising a set of data objects queued in a first sequential order;

for each data object in the data object queue:

map the data object to a data point in a coordinate space;

for the data object queue:

identify a set of data object pairs, each comprising a pair of adjacent data objects queued in the data object queue;

for each data object pair of the set of data object pairs:

calculate a distance between a data point pair in the coordinate space that maps to the data object pair;

sort the set of data objects queued in the data object queue based at least on the distance calculated for each data object pair;

obtain, based on the sorting, the set of data objects queued in a second sequential order; and transmit the set of data objects queued in the second sequential order to a target host.

11. The CRM of claim 10, wherein the computer program, when executed by the computer processor, further enables the computer processor to:

for each data object in the data object queue:

obtain a data criticality associated with the data object; and identify a priority weight for the data object based on the data criticality, wherein the distance calculated for each data object pair incorporates the priority weight for each adjacent data object of the data object pair.

12. The CRM of claim 11, wherein the distance calculated for each data object pair is a modified weight-based Euclidean distance.

13. The CRM of claim 11, wherein the computer program, when executed by the computer processor, further enables the computer processor to:

examine header information of each data object, to obtain the data criticality associated with the data object, wherein the data object is one selected from a group consisting of a data packet and a data block.

14. The CRM of claim 11, wherein the computer program, when executed by the computer processor, further enables the computer processor to:

perform a lookup on a priority assignment object using at least one selected from a group consisting of a file type and a file name, associated with the data object, to obtain the data criticality associated with the data object, wherein the data object is a data file.

15. The CRM of claim 10, wherein the coordinate space is a two-dimensional Cartesian coordinate space.

16. The CRM of claim 15, wherein mapping the data object to the data point in the two-dimensional Cartesian coordinate space, comprises:

mapping a queue number associated with the data object to an abscissa of the data point; and mapping a sequence position associated with the data object to an ordinate of the data point, wherein the queue number identifies the data object queue within which the data object resides, wherein the sequence position identifies a location with respect to the first sequential order at which the data object resides.

17. The CRM of claim 10, wherein the first sequential order queues the set of data objects according to an arrival based scheme.

18. The CRM of claim 10, wherein each data object in the data object queue is one selected from a group consisting of a data packet, a data block, and a data file.

19. A backup storage system (BSS), comprising:

a processor;

a memory comprising instructions, which when executed by the processor, perform a method, the method comprising:

identifying a data object queue comprising a set of data objects queued in a first sequential order;

for each data object in the data object queue:

mapping the data object to a data point in a coordinate space;
for the data object queue:
identifying a set of data object pairs, each comprising a pair of adjacent data objects queued in the data object queue;
for each data object pair of the set of data object pairs:
calculating a distance between a data point pair in the coordinate space that maps to the data object pair;
sorting the set of data objects queued in the data object queue based at least on the distance calculated for each data object pair;
obtaining, based on the sorting, the set of data objects queued in a second sequential order; and
transmitting the set of data objects queued in the second sequential order to a target host.

20. The BSS of claim 19, wherein the method further comprises:
for each data object in the data object queue:
obtaining a data criticality associated with the data object; and
identifying a priority weight for the data object based on the data criticality,
wherein the distance calculated for each data object pair incorporates the priority weight for each adjacent data object of the data object pair.

* * * * *